(12) United States Patent
Lee et al.

(10) Patent No.: US 10,725,834 B2
(45) Date of Patent: Jul. 28, 2020

(54) JOB SCHEDULING BASED ON NODE AND APPLICATION CHARACTERISTICS

(71) Applicant: International Business Machines Corporation, Armonk, NY (US)

(72) Inventors: Eun Kyung Lee, Bedford Corners, NY (US); Bilge Acun, White Plains, NY (US); Yoonho Park, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 15/827,208

(22) Filed: Nov. 30, 2017

(65) Prior Publication Data
US 2019/0163540 A1 May 30, 2019

(51) Int. Cl.
*G06F 9/50* (2006.01)
*G06F 9/455* (2018.01)

(52) U.S. Cl.
CPC ........ *G06F 9/5094* (2013.01); *G06F 9/45558* (2013.01); *G06F 9/505* (2013.01); *G06F 9/5033* (2013.01); *G06F 9/5077* (2013.01); *G06F 9/5083* (2013.01); *G06F 2009/4557* (2013.01)

(58) Field of Classification Search
CPC ...... G06F 9/5094; G06F 9/4893; G06F 9/505; G06F 9/5083; G06F 9/5088; G06F 1/329; G06F 1/3203; H04L 41/0833
See application file for complete search history.

(56) References Cited

U.S. PATENT DOCUMENTS

| | | |
|---|---|---|
| 5,930,511 A | 7/1999 | Hinsley |
| 7,596,714 B2 | 9/2009 | Rothman et al. |
| 8,055,822 B2 | 11/2011 | Bernstein et al. |
| 8,365,193 B2 | 1/2013 | Chidambaran et al. |
| 8,589,931 B2 * | 11/2013 | Barsness ............... G06F 1/3203 718/102 |
| 8,612,984 B2 | 12/2013 | Bell, Jr. et al. |

(Continued)

OTHER PUBLICATIONS

Teodorescu et al., "Variation-Aware Application Scheduling and Power Management for Chip Multiprocessors," 2008 International Symposium on Computer Architecture (ISCA), pp. 363-374, 2008.

*Primary Examiner* — Austin J Moreau
(74) *Attorney, Agent, or Firm* — Daniel R. Simek

(57) ABSTRACT

Aspects of the present invention disclose a method, computer program product, and system for scheduling an application. The method includes one or more processors receiving a task, the task includes instructions indicating desired nodes to perform the task through programs. The method further includes one or more processors identifying application characteristic information and node characteristic information associated with nodes within a data center composed of nodes. The application characteristic information includes resource utilization information for applications on nodes within the data center. The method further includes one or more processors determining that the nodes reach a threshold level of power consumption. The threshold level is a pre-set maximum amount of power utilized by a node within the data center. The method further includes one or more processors determining a node consuming an amount of power that is below a threshold level of power consumption in the data center.

20 Claims, 5 Drawing Sheets

(56) References Cited

U.S. PATENT DOCUMENTS

| | | |
|---|---|---|
| 8,671,418 B2 | 3/2014 | Barsness et al. |
| 9,128,775 B2 | 9/2015 | Weinman, Jr. |
| 9,575,536 B2 | 2/2017 | Rajappa et al. |
| 2011/0023047 A1 | 1/2011 | Memik |
| 2012/0005683 A1* | 1/2012 | Bower, III ............ G06F 9/5094 718/103 |
| 2012/0198253 A1* | 8/2012 | Kato ..................... G06F 1/20 713/320 |
| 2016/0162004 A1* | 6/2016 | Ljubuncic ............ G06F 1/3228 713/320 |
| 2016/0188365 A1* | 6/2016 | Bodas ................... G06F 9/4881 718/102 |
| 2016/0232091 A1* | 8/2016 | Wang .................... G06F 12/084 |
| 2017/0255240 A1* | 9/2017 | Matteson ................ G06F 1/26 |
| 2018/0024861 A1* | 1/2018 | Balle .................... G06F 3/0613 718/104 |

\* cited by examiner

JOB SCHEDULING BASED ON NODE AND APPLICATION CHARACTERISTICS

BACKGROUND

The present invention relates generally to the field of data processing systems, and more particularly to machine management.

In a distributed computing environment, the execution of software and programs can be deployed to hardware that supports physical and virtual systems (e.g., virtual machines). In addition, various components within a computing system can be virtualized, such as network switches and communication adapters. A virtual machine (e.g., an application server) can be dynamically configured (e.g., computational speed, multitasking, high-volume network traffic, response time, reliability, etc.) and optimized for the applications executed on the virtual machine (VM). Virtual machines provide improved availability (e.g., fault-tolerance), improved performance (e.g., bandwidth), improved scalability, and improved maintainability (e.g., disaster recovery processes).

Data centers have evolved away from individual servers and PCs to rack mounted "blade" server "farms" and RISC (reduced instruction set computing) systems (computing clusters) and most recently "cloud" computing powered by mainframe computers that can be "virtualized" into entities and systems tailored to a customer's requirements. Data centers utilizing virtualization of computing resources range from enterprise systems dedicated to a site within a company to distributed computing environments that sell access to their computing resources on an as-needed basis (e.g., cloud computing). Cloud computing is a model of service delivery for enabling convenient, on-demand network access to a shared pool of configurable computing resources that may be rapidly provisioned and released with minimal management effort or interaction with a provider of the service. For example, cloud computing allows a customer to obtain data processing resources, such as networks, network bandwidth, servers, processing, memory, storage, applications, virtual machines, and services as a service on a temporary basis when needed.

Within a networked computing environment, such as data center, some portions of the environment include computing systems that include various virtualization technologies. The networked computing environment may include: one or more computing systems that include a plurality of interconnected physical resources (e.g., microprocessors, memory, storage devices, communication devices, etc.); a local group/cluster of computing systems, such as racks of blade servers, network-attached storage (NAS) systems, and storage area networks (SANs); distributed computing environments, such as a cloud infrastructure; or any combination thereof. Within a virtualized system, each computing entity behaves as if the computing entity were a separate system, such as a computing node, a storage system, and/or a networking system. In system virtualization, multiple virtual entities are created and "hosted" within a physical system. Examples of virtual entities are: virtual servers, virtual storage, virtual networks including virtual private networks, virtual applications and operating systems, and virtual clients. The physical system can be a stand-alone computer, or alternatively, a computing system utilizing clustered computers and components. Virtual systems are independent operating environments that use virtual resources made up of logical divisions of physical resources such as microprocessors, memory and input/output (I/O) adapters. This system virtualization is implemented through some managing functionality.

SUMMARY

According to one embodiment of the present invention, a method for scheduling an application is provided. The method for scheduling an application may include one or more processors receiving a task, wherein the task includes instructions indicating one or more desired nodes to perform the task through executing one or more programs. The method further includes one or more processors identifying application characteristic information and node characteristic information associated with one or more nodes within a data center composed of a plurality of nodes, wherein the application characteristic information includes resource utilization information for one or more applications on one or more nodes within the data center composed of the plurality of nodes. The method further includes one or more processors determining that one or more of the desired nodes have reached a threshold level of power consumption, wherein a threshold level is a pre-set maximum amount of power utilized by a node within the data center composed of the plurality of nodes. The method further includes determining at least one node consuming an amount of power that is below a respective threshold level of power consumption in the data center.

DETAILED DESCRIPTION

Embodiments of the present invention recognize that the intrinsic manufacturing differences of hardware components (node sub-components: such as Central Processing Units, Graphic Processing Units, memory, disk, network cards, etc.) in a compute node can cause power variations among the same model of hardware components. For Example, the aforementioned manufacturing differences can result in power variations and/or power efficiency differences among Central Processing Units (CPUs) within the same node.

Embodiments of the present invention recognize that temperature variation within the data center also contributes to power variations among nodes. Additional embodiments of the present invention recognize that current approaches to application scheduling and power management do not consider multiple nodes and multiple components within the individual node.

Embodiments of the present invention provide a method to make a power efficient job scheduling decision by taking into account the power variations of the individual hardware components within the node and the application characteristics. The system uses a database of power efficiency (leakage power, temperature, and voltage) information of the compute nodes of the data center and the individual sub-components within the nodes to reduce the amount of power consumed, provide energy savings, and provide performance improvement.

Figure 1:
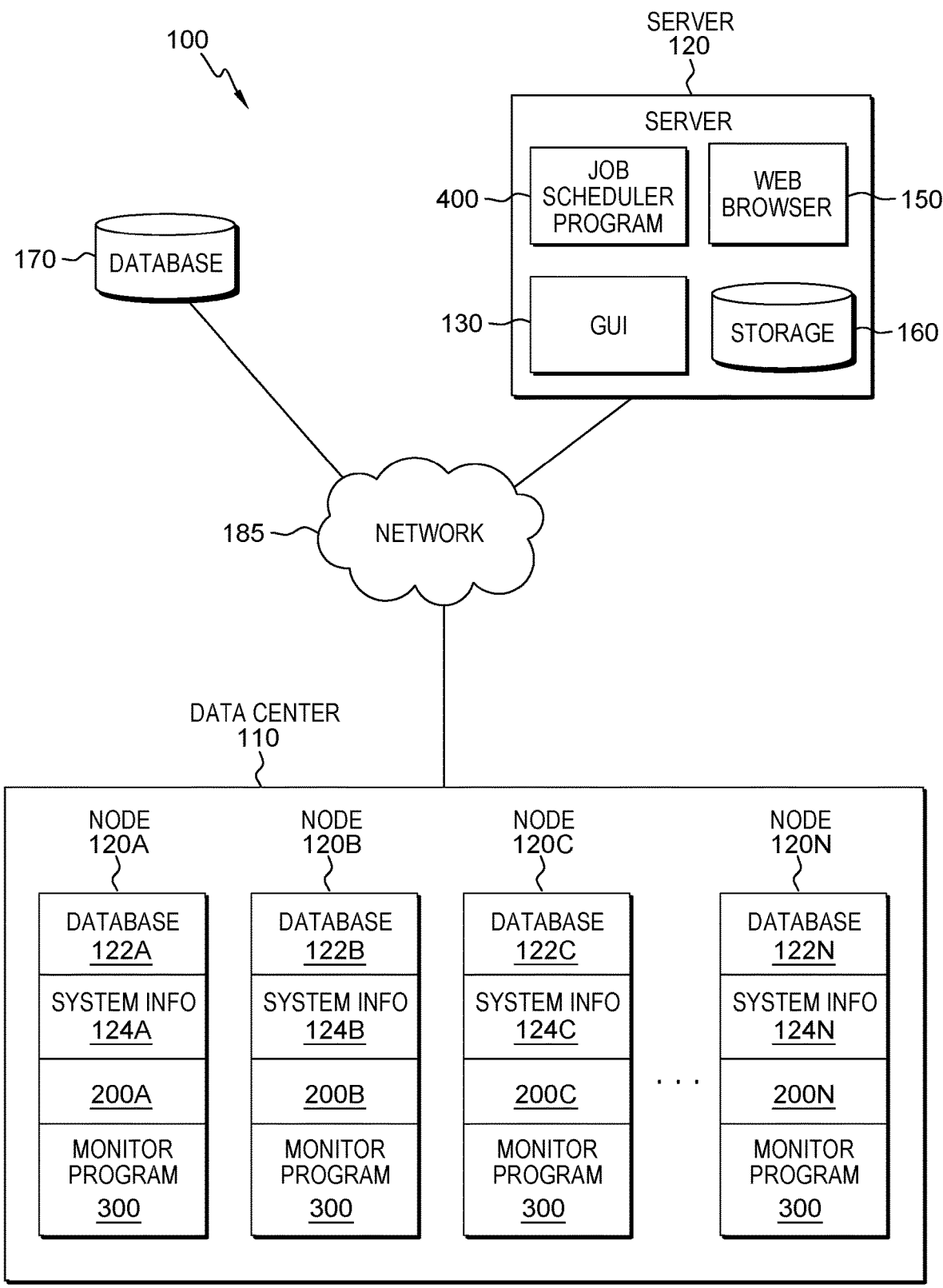
FIG. 1 is a functional block diagram illustrating a distributed data processing environment, in accordance with an embodiment of the present invention.

Example embodiments in accordance with the present invention will now be described in detail with reference to the Figures. FIG. 1 is a functional block diagram, illustrating distributed data processing environment 100. Distributed data processing environment 100 includes data center 110, server 120, interconnected over network 185.

In an embodiment, data center 110 is comprised of physical and virtualized systems. Physical systems can be a stand-alone computer, or alternatively, a computing system utilizing clustered computers and components. The computing environment may include: a computing system that includes a plurality of interconnected physical resources (e.g., microprocessors, memory, storage devices, communication devices, etc.); a local group/cluster of computing systems, such as racks of blade servers, network-attached storage systems, and storage area networks SAN); distributed computing environments, such as a cloud infrastructure; or any combination thereof.

Data centers are composed of independent operating environments that use resources made up of logical divisions of physical resources, such as node 120A thru node 120N. In one embodiment data center 110 is divided into multiple nodes that include node 120A thru 120N. In an illustrated example, node 120A runs an independent operating physical environment, such as an operating system (OS). Node 120A includes: database 122A, system info 124A, configuration 200A, and monitor program 300. Node 120B includes: database 122B, system info 124B, configuration 200B, and monitor program 300. Node 120C includes: database 122C, system info 124C, configuration 200C, and monitor program 300. Node 120N includes: database 122N, system info 124N, configuration 200N, and monitor program 300. Node 120N and the components of Node 120N represent that data center 110 is capable of being composed of multiple instances of nodes beyond what is depicted in FIG. 1.

Database 122A and system info 124A include information associated with application characteristics and node efficiency of respective individual nodes. Database 122A contains and updates a profile of power efficiency (power, temperature, and voltage) information of node 120A of data center 110 and the individual sub-components within node 120A. In an example, database 122A sends and receives information from database 170 and monitors the applications in data center 110 to predict the dynamic power consumption of each sub-component in the node (i.e. GPU usage, memory usage etc.). System info 124A monitors and compiles the totality information from the various programs on node 120A. In an example, system info 124A utilizes one or more networking utilities to determine information associated with node 120A. Information monitored and compiled by system info 124A may include: a status, a retry rate, a packet loss rate, a queuing delay, a propagation delay, an error rate, a fault, and a handshaking error.

Configuration 200 is a depiction of the sub components of node 120A and includes resource manager 202, disk 204, network adapter 206, CPUs 208, GPUs 210, memory components 212, and system monitor 216. Configuration 200A is described in further detail below, with respect to FIG. 2A. Monitor program 300 is a software application common to each node in data center 110. Monitor program 300, in conjunction with hardware component system monitor 216 (depicted in FIG. 2A), observes the dynamic behavior of the sub-components of the nodes during the runtime. Monitor program 300 ranks the power efficiency of individual nodes, and the totality of nodes that make up data center 110. In one embodiment, monitor program 300 ranks the power efficiency consumption (e.g., total power efficiency, average power efficiency, etc.) of the nodes based on the respective efficiency of the node. In an example, monitor program 300 assigns a node with efficient power consumption a numerical value of 5, and monitor program can assign a node with inefficient power consumption a numerical value of 1. Job scheduler program 400 analyzes the efficiency rating and uses the efficiency rating compiled by monitor program 300 as determinative in allocating applications to a new node. In additional embodiments, due to each respective node including multiple components, monitor program 300 and job scheduler program 400 can determine a ranking based on a specific component. For example, in instances where an application is going to heavily utilize the specific component for a process, such as utilization of the CPU for CPU intensive applications.

Server 120 may be a desktop computer, a laptop computer, a tablet computer, a specialized computer server, a smartphone, or any other computer system known in the art. In certain embodiments, server 120 represents a computer system utilizing clustered computers and components that act as a single pool of seamless resources when accessed through network 185, as is common in data centers and with cloud computing applications. In general, server 120 is representative of any programmable electronic device or combination of programmable electronic devices capable of executing machine-readable program instructions and communicating with other computer devices via a network. In one embodiment, server 120 includes graphical user interface 130, web browser 150, storage 160, and job scheduler program 400.

In an embodiment, server 120 is capable of initiating a handshake process between server 120 and data center 110. Handshaking is an automated process of negotiation that dynamically sets parameters of a communications channel established between two entities before normal communication over the channel begins. Handshaking follows the physical establishment of the channel and precedes normal information transfer. Handshaking facilitates connecting heterogeneous computing systems, or equipment, over a communication channel without the need for user intervention to set parameters. In an example, server 120 initiates the handshake process by sending a massage to data center 110 indicating that server 120 wants to establish a communication channel in order to gain access to programs on data center 110.

In one embodiment, graphical user interface 130 operates on server 120. In another embodiment, graphical user interface 130 operates on another computer in a server based setting, for example on a server computer not pictured. In yet another embodiment, graphical user interface 130 operates on server 120 simultaneously with another server computer interconnected through network 185. Graphical user interface 130 may be any user interface used to access information from server 120, such as information gathered or produced by job scheduler program 400. Additionally, graphical user interface 130 may be any user interface used to supply information to server 120, such as information supplied by a user to be used by job scheduler program 400. In some embodiments, graphical user interface 130 may present a generic web browser used to retrieve, present, and negotiate resources from the Internet. In other embodiments, graphical user interface 130 may be a software or application that enables server 120 access to network 185.

In yet another embodiment, server 120 can interact with graphical user interface 130 through a touch screen that performs as both an input device to a graphical user interface (GUI) and as an output device (i.e., an electronic display) presenting a plurality of icons associated with software applications or images depicting the executing software application. Optionally, a software application (e.g., a web browser) can generate graphical user interface 130 operating within the GUI of server 120. Graphical user interface 130 accepts input from a plurality of input/output (I/O) devices including, but not limited to, a tactile sensor interface (e.g., a touch screen or a touchpad) referred to as a multi-touch display. An I/O device interfacing with graphical user interface 130 may be connected to server 120, which may operate utilizing wired (e.g., USB port) or wireless network communications (e.g., infrared, NFC, etc.). Server 120 may include components, as depicted and described in further detail with respect to FIG. 4, in accordance with embodiments of the present invention.

Storage 160 (e.g., a database) located on server 120, represents any type of storage device capable of storing data that is accessed and utilized by server 120. In other embodiments, storage 160 represents multiple storage devices within server 120. Storage 160 stores information such as, but not limited to, account information, credentials for authentication, user preferences.

Job scheduler program 400 analyzes a computer node (e.g., node 120A) to find the power, temperature, voltage variations of the sub-components in the node. Job scheduler program 400 ranks the nodes and the subcomponents of the nodes in terms of power efficiency. Job scheduler program 400 stores power efficiency information in database 170. In an embodiment, job scheduler program 400 uses power efficiency information of the computer nodes of data center 110 and the individual sub components within the nodes on database 170 and monitors the applications in the nodes of data center 110. In an example, job scheduler program 400 uses power efficiency information to predict the dynamic power consumption of each sub component in the node (GPU usage, memory usage, etc.) and stores the profile in database 170 for reuse. Job scheduler program 400 determines a dynamic placement of the jobs to the nodes, which has optimal efficiency based on both node and the application characteristics, using database 170.

Database 170 is an online monitoring database that stores a profile of power efficiency (leakage power, temperature, and voltage) information of the computer nodes of the data center and the individual sub-components within the nodes. Job scheduler program 400 uses database 170 and monitors the applications in data center 110 to predict the dynamic power consumption of each sub-component in the node (i.e. GPU usage, memory usage etc.). Database 170 analyzes and stores application characteristics such as sub-component utilization rates and hardware counters along with node characteristics, such as the dynamic and static power consumption of the specific nodes (with respective node IDs) on which the application is running. Database 170 provides node and application characteristics of power efficiency to job scheduler program 400.

In general, network 185 can be any combination of connections and protocols that will support communications throughout data processing environment 100. Network 185 can include, for example, a local area network (LAN), a wide area network (WAN), such as the Internet, a cellular network, or any combination of the preceding, and can further include wired, wireless, and/or fiber optic connections.

Figure 2A:
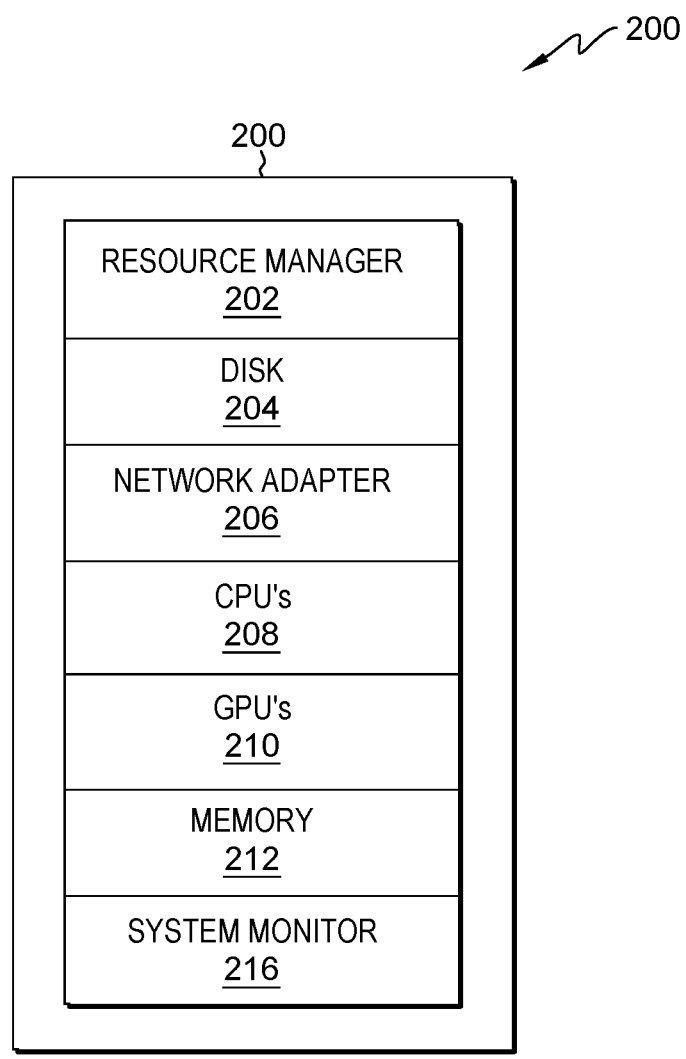
FIG. 2A illustrates an example of a configuration of one or more compute nodes in the data center utilized within a networked computing environment, in accordance with an embodiment of the present invention.

FIG. 2A depicts a functional block diagram illustrating configuration 200A thru 200N of node 120A thru node 120N within data center 110 of FIG. 1. In an embodiment, configuration 200 includes resource manager 202, disk 204, network adapter 206, CPU 208, GPU 210, memory 212, and system monitor 216.

Resource manager 202 provides the ability to divide physical computing system resources into isolated logical partitions. A resource manager allocates (e.g., provisions) various physical and virtual resources of a larger computing system to the computing entities that are hosted by the larger computing system. One type of resource manager (e.g., a native resource manager) may load via firmware; whereas, another type of resource manager (e.g., a hosted resource manager) executes as a process of a higher-level operating system. A higher-level operating system and information associated with configuring a computing system can be included in a bootable image of an operating system. Resource managers provide the greatest level of flexibility in how resources are defined and managed.

In an embodiment, resource manager 202 utilizes a thin layer of code in software or firmware to achieve fine-grained, dynamic resource sharing within in a node. In an example, resource manager 202 provides the ability to divide physical computing system resources into isolated logical partitions (also referred to as LPARs). Each logical partition operates like an independent computing system running a respective operating system. Resource manager 202 allocates dedicated processors (i.e., CPUs), I/O adapters, and memory to each logical partition. Resource managers allocate shared resources (e.g., processors, memory, storage space, etc.) to each machine (VM). Resource manager 202 also dynamically allocates and de-allocates dedicated or shared resources (such as processors, I/O, and memory) across LPARs while the machines are actively in use. This is known as dynamic logical partitioning or dynamic LPAR and allows the resource manager to dynamically redefine all available system resources to reach optimum capacity for each partition.

Disk 204 can include a solid state hard drive, a semiconductor storage device, read-only memory (ROM), erasable programmable read-only memory (EPROM), flash memory, or any other computer readable storage media that is capable of storing program instructions or digital information. In one embodiment, disk 204 is removable. In an example, a disk 204 may be used for persistent storage. In another example, disk 204 may include optical and magnetic disks, thumb drives, and smart cards that are inserted into a drive for transfer onto another computer readable storage medium that is also part of persistent storage.

Central Processing Unit 208, (CPU) receives data input, executes instructions, and processes information. CPU 208 communicates with Input/Output (I/O) devices, which send and receive data to and from the CPU. Additionally, CPU 208 has an internal bus for communication with the internal cache memory, called the backside bus. The main bus for data transfer to and from the CPU, memory, chipset, and AGP socket is called the front side bus. CPU 208 contains internal memory units, which are called registers. These registers contain data, instructions, counters, and addresses used in the ALU information processing.

Graphics Processing Unit 210, (GPU) is a programmable logic chip (processor) specialized for display functions. In an embodiment, GPU 210 assists job scheduler program 400 in scheduling applications and characterizing applications. In an example, GPU 210 renders images, animations and video for the computer's screen. GPUs are located on plug-in cards, in a chipset on the motherboard or in the same chip as the CPU. GPU 210 performs parallel operations. Although GPU 210 is used for 2D data as well as for zooming and panning the screen, GPU 210 assists with decoding and rendering of 3D animations and video. The more sophisticated the GPU, the higher the resolution and the faster and smoother the motion in games and movies. GPUs on stand-alone cards include their own random-access memory (RAM), while GPUs in the chipset or CPU chip share main memory with the CPU. GPU 210 has a massively parallel architecture consisting of thousands of smaller, more efficient cores designed for handling multiple tasks simultaneously. GPU 210 lifts the burden from CPU 208 to free up cycles that could be used for other jobs.

Network adapter 206 provides for communications with other data processing systems or devices. In an embodiment, Network adapter 206 includes one or more network interface cards. In an example, Network adapter 206 may provide communications through the use of either or both physical and wireless communications links.

Memory 212 is computer readable storage media. In an embodiment, memory 212 includes random access memory (RAM). In general, memory 212 can include any suitable volatile or non-volatile computer readable storage media.

System monitor 216 observes individual nodes on data center 110. System monitor 216 tracks things such as disk and memory use on monitored systems. It also carries out regular tests of services that are meant to be running. System monitor 216 constantly exchanges information with monitor program 300 to assist job scheduler program 400 in the analysis that job scheduler program 400 performs.

Figure 2B:
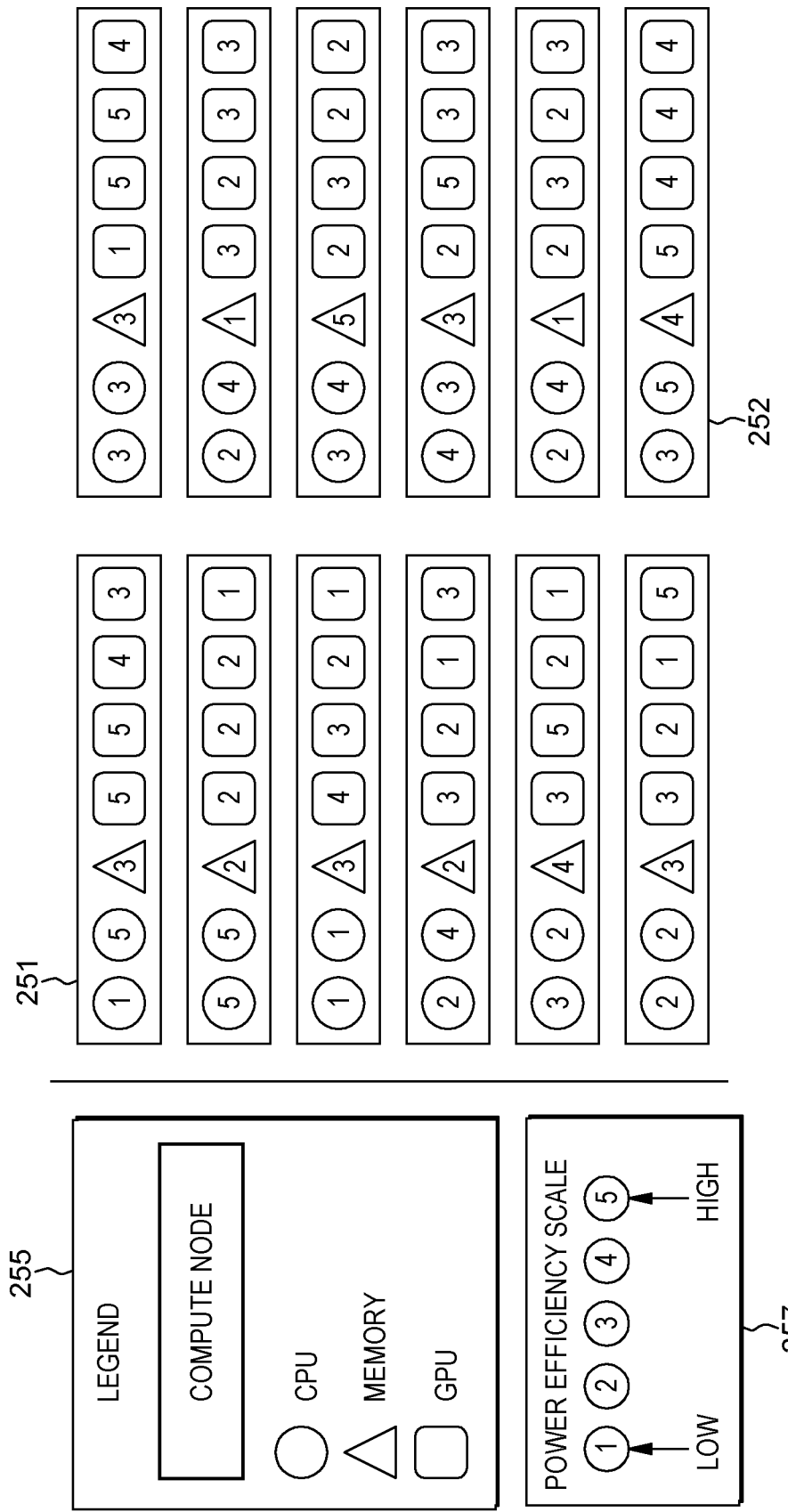
FIG. 2B illustrates an example of a data center, including a plurality of computing nodes and respective components and respective power efficiency information, in accordance with an embodiment of the present invention.

FIG. 2B depicts an example illustration of data center 250, including a plurality of computing nodes and respective components and respective power efficiency information, in accordance with various embodiments of the present invention.

In various embodiments, data center 250 is an exemplary depiction of data center 110 (depicted in FIG. 1) including a plurality of compute nodes, such as compute node 251 and compute node 252. FIG. 2B includes legend 255, which depicts an explanatory table of the symbols that are utilized in data center 250 and FIG. 2B. FIG. 2B also includes power efficiency scale 257, indicating that the numbers 1 through 5 represent power efficiency values in the respective components of compute nodes of data center 250 (1 being the lowest and 5 being the highest).

In the depicted example, compute node 251 includes two CPUs having respective power efficiency values of 1 and 5, one memory having a power efficiency value of 3, and four GPUs having respective power efficiency values of 5, 5, 4, and 3. Further, in the depicted example, compute node 252 includes two CPUs having respective power efficiency values of 3 and 5, one memory having a power efficiency value of 4, and four GPUs having respective power efficiency values of 5, 4, 4, and 4. As depicted in FIG. 2B, data center 250 includes a multitude of additional compute nodes, each having respective CPSs, memory, and GPU, which each have respective power efficiency values. In various embodiments of the present invention, job scheduler program 400 and monitor program 300 can operate to analyze compute nodes and respective components of data center 250, and accordingly execute corresponding actions based on the results of the analysis.

Figure 3:
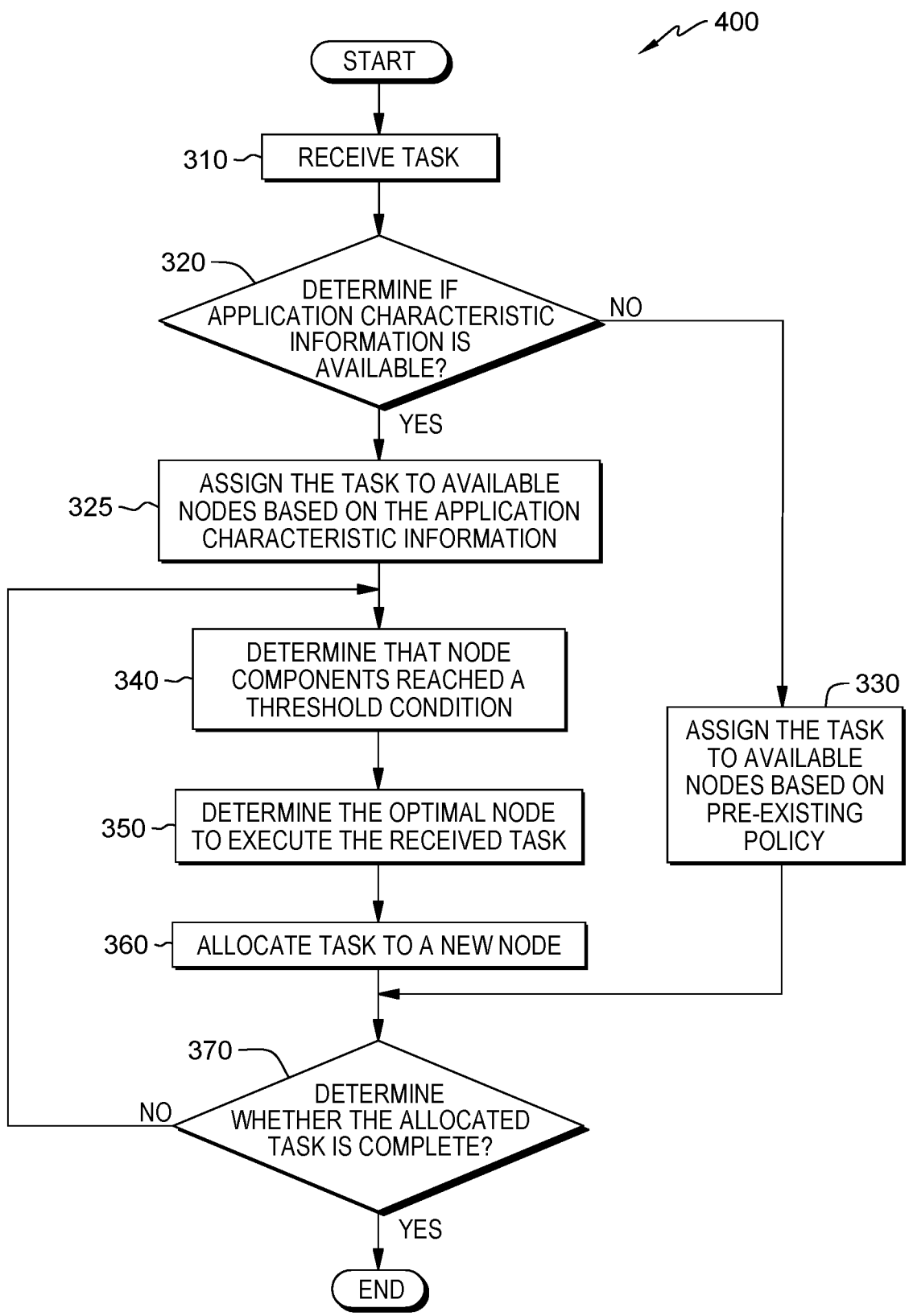
FIG. 3 illustrates operational steps of a job scheduler program, to find an optimal node for dynamic job allocation, in accordance with an embodiment of the present invention.

FIG. 3 is a flowchart depicting the operational steps of job scheduler program 400, a program for finding an optimal node for dynamic job allocation, in accordance with an embodiment of the present invention.

In step 310, job scheduler program 400 receives a task. In an embodiment, a job arrives to a node and the node performs the task based upon the nature of the job. Job scheduler is capable of performing tasks such as searching a database, updating records in a database, with the data coming from the nodes, analyzing data or backing up data, etc. Nodes are capable of performing the tasks such as performing computations through executing one or more programs. Nodes are also capable of performing tasks through facilitating cooperation between one or more nodes. In an example, job scheduler program 400 receives notification of a task assigned to node 120A of data center 110. In this example, the received task includes analyzing a large compilation of data.

In another embodiment, job scheduler program 400 immediately allocates a task to a node. In an example, job scheduler program 400 is capable of performing an analysis on one or more nodes based upon an initial allocation of a task to a node based on user preferences. In this example, job scheduler program 400 assigns a task and the assigned node initiates processing of the task in this step until job scheduler program 400 determines that the node reaches a threshold condition. In another example, job scheduler program 400 analyzes the dynamic power consumption of a task for a predetermined amount of time according to user preference. In this example, job scheduler program 400 analyzes the dynamic power consumption of a task for 10 minutes. After 10 minutes, job scheduler program determines if the task has reached any of the threshold conditions before job scheduler program 400 allocates the task to a new node.

In decision step 320, job scheduler program 400 determines whether application characteristic information is available in the database. In various embodiments, application characteristic information includes application metrics, sequence metrics, and utilized resources of one or more applications on a node. In an embodiment, job scheduler program 400 profiles a node to analyze the node to find the power, temperature, voltage and variations of the sub components in the node. In this example, job scheduler program 400 also analyzes database 170 as a function of database 170 being a repository, or information sink, for information associated with node 120A, compiled from database 122A, configuration 200A, and monitor program 300. In one scenario, job scheduler program 400 determines that database 170 contains information, based upon an analysis of data contained in database 170, concerning power efficiency data for node 120A, leakage information data for node 120A, an average efficiency of node 102A, the efficiency of the sub-components in node 120A, and the application characteristics that node 120A is assigned to achieve the task.

In response to determining that node information is available (decision step 320, "yes" branch), job scheduler program 400 assigns the task to available nodes based on the application characteristic information (step 325). In one embodiment, job scheduler program 400 utilizes the application characteristic information corresponding to the received task (determined to be available in decision step 320) to determine one or more appropriate (and available) nodes in data center 110, and then assign the task accordingly. For example, job scheduler program 400 identifies available nodes in data center 250 and determines which available nodes include components that have respective power efficiency information that meets the application characteristic information associated with the task. Job scheduler program 400 can then assign the task to one or more of the determined nodes.

In an example embodiment, an application is associated with respective characteristic information that is stored in database (e.g., database 170). Job scheduler program 400 determines that the characteristic information is available and that the characteristic information indicates that the application is CPU-intensive. In this example embodiment, if the application is allocated to non-efficient CPU, then the frequency may be throttled and CPU temperature may be high. Job scheduler program 400 can determine which nodes within a data center can be optimally efficient to execute the application (or another task), and schedule the application for execution accordingly. In additional embodiments, an application can be a combination of GPU intensive, memory intensive, I/O intensive, etc. (or, alternatively none of the previous).

In response to determining that no application characteristic information is available (decision step 320 "no" branch), job scheduler program 400 assigns the task to available nodes based upon a pre-existing scheduling policy (step 330).

In step 330, job scheduler program 400 assigns the task to available nodes based on a pre-existing scheduling policy. In an embodiment, job scheduler program 400 uses a pre-existing policy to determine allocation based on available nodes. In an example, job scheduler program 400 uses a default setting identified from input from a user to allocate a task, to compress data from an external database, based upon available nodes.

In this embodiment, job scheduler program 400 assigns the task to available nodes, and directs the application to a new node. In an example, job scheduler program 400 oscillates through the process, without dynamic scheduling and analysis, of assigning tasks to available notes based on a pre-existing scheduling policy and directing the task to the new node (e.g., via dynamic migration). After job scheduler program 400 completes this step, job scheduler program 400 proceeds to decision step 370. In various embodiments, job scheduler program 400 can utilize any standard (i.e., non-power-aware) job scheduling policy.

In step 340, job scheduler program 400 determines that node components reached a threshold condition. In various embodiments, the threshold condition can be characterized as being indicative of any node, or node component, consuming high power, reaching the thermal design point, or displaying frequency throttling. In an embodiment, job scheduler program 400 analyzes the total node power cap and the power cap of the individual subcomponents to detect dynamic power draw and utilization rates. In one scenario, job scheduler program 400 profiles the activity of resource manager 202 on node 120A directly. In an example, job scheduler program 400 profiles the resource manager 202 on node 120A to determine dynamic power consumption on node 120A as a function of the power consumption characteristics of resource manager 202. Job scheduler program 400 stores the dynamic power consumption information of the resource manager 202.

In another embodiment, job scheduler program 400 uses pre-existing information in the database to characterize the applications on node 120A and the consumption of power and determines that the node, or sub components of the node have reached a threshold point. In this example, job scheduler program 400 further profiles the applications to make predictions about the application on node 120A and the dynamic power consumption in each sub-component of the node (GPU usage, memory usage, etc.) based upon the history of the application's power consumption profile in database 170 and compares current dynamic power consumption of the sub component to the total power consumed by individual nodes. Job scheduler program 400 determines whether the entire node, as a function of one or more sub components reaching threshold condition, has reached threshold condition or maximum power consumption.

In step 350, job scheduler program 400 determines the optimal node to execute the received task. In an embodiment, based upon the information derived in step 340, job scheduler program 400 determines the optimal node to minimize data center 110 power consumption and to improve performance. In an example, job scheduler program 400 determines that data center 110 is consuming high power as a function of the sub components of a node, and thus one or more nodes, consuming excess power. In this example, job scheduler program 400 determines that an analysis of a node's total power efficiency may not be sufficient for finding the optimal allocation for an application to migrate large amounts of data. Job scheduler program 400 determines the optimal node destination for an application through an analysis of the average efficiency of the node, the efficiency of the sub-components of the node through the history information in database 170, and application characteristics. In this example, job scheduler program 400 predicts that an application to migrate data has historically consumed more power than is currently available in the current node assigned the task. Job scheduler program 400 is vigilant that while a node could have good power efficiency overall, one inefficient CPU can degrade the performance of a CPU intensive application such as migrating large amounts of data.

In step 360, job scheduler program 400 allocates the task and directs the application to a node. In an embodiment, job scheduler program 400 schedules the application on the optimal nodes. In an example, job scheduler program 400 allocates the migration application (i.e., a received task) to node 120C based upon the power efficiency data, in database 170, indicating that node 120C is a better candidate node as a function of node 120C consuming less power.

In another embodiment, job scheduler program 400 initiates the allocation of an application to a more efficiently operating node (e.g., relative to an initially indicated node) and then job scheduler program 400 reverts into a sentry monitoring mode. Job scheduler program 400 determines whether migrating allocation of an application to a new node(s) is beneficial based on whether comparing the resource cost of migration to the performance and power benefit coming from the migration with a custom threshold, to prevent the high-power cost of frequent migration. In an embodiment, job scheduler program 400 determines that all available nodes are operating at an efficiency rate that would result in the application migrating more than once. In an example, job scheduler program 400 determines that every node in data center 110 is operating within 0.5% efficiency within each other. Job scheduler program 400 determines that the application can be allocated from node to node because job scheduler program 400 has detected minimal differences between the power consumption efficiency in the nodes. In this example, job scheduler program 400 can quickly move the application multiple times between one or more nodes.

In decision step 370, job scheduler program 400 determines whether the allocated task is complete. In an embodiment, as a function of step 330 assigning the task based upon a pre-existing scheduling policy, job scheduler program 400 analyzes one or more sub components on a node to determine if the assigned task is complete. Job scheduler program 400 analyzes utilized resources of one or more sub components performing applications on a node. In response to determining that the allocated task is complete, job scheduler program 400 ends. In response to determining that the allocated task is not complete, job scheduler program 400 returns to step 340. In various embodiments, job scheduler program 400 returning to step 340 established a loop, which facilitates job scheduler program 400 to perform dynamic monitoring of tasks and nodes of the data center and environment. In one scenario, job scheduler program can utilize a defined and/or customized time period to loop back to step 340 (e.g., return to step 340 every 30 seconds). In an example, job scheduler program 400, as a result of determining that the allocated task is not complete, determines, as depicted in step 340, that the components have reached the thermal design point. Job scheduler program 400 determines the optimal node to execute the task.

Figure 4:
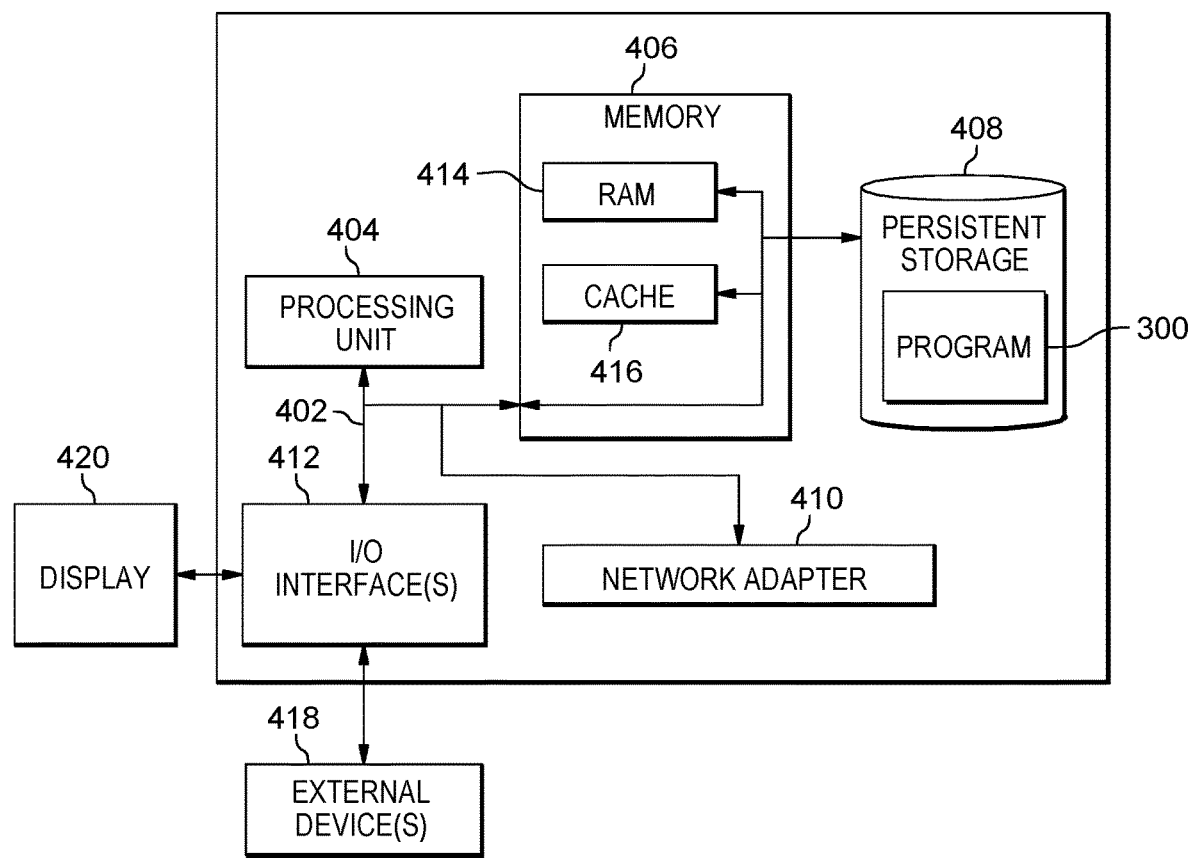
FIG. 4 is a block diagram of components of a computer system, such as the server computer of FIG. 1, in accordance with an embodiment of the present invention.

FIG. 4 depicts a block diagram of components of server 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 120 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Job scheduler program 400 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Job scheduler program 400 may be downloaded to persistent storage 408 through communications unit 410.

I/O interface(s) 412 allows for input and output of data with other devices that may be connected to server 120. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., program 200, can be stored on such portable computer readable storage media and can be loaded onto persistent storage 408 via I/O interface(s) 412. I/O interface(s) 412 also connect to a display 420. Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for scheduling an application, the method comprising:
   receiving, by one or more processors, a task, wherein the task includes instructions indicating one or more desired nodes, within a data center composed of a plurality of nodes, to perform the task;
   identifying, by one or more processors, application characteristic information associated with the task, wherein the application characteristic information includes resource utilization information for one or more applications on the one or more desired nodes within the data center associated with executing the task;
   determining, by one or more processors, sub-component characteristic information associated with the one or more desired nodes, wherein the sub-component characteristic information includes power efficiency information calculated for each of the respective sub-components of the one or more desired nodes;
   in response to determining that the power efficiency information of the one or more desired nodes and respective sub-components meets the application characteristic information associated with executing the task, assigning, by one or more processors, the received task to the one or more desired nodes; and
   determining, by one or more processors, that one or more of the desired nodes have reached a threshold level of power consumption, wherein a threshold level is a pre-set maximum amount of power utilized by a node within the data center composed of the plurality of nodes.

2. The method of claim 1, wherein the received tasks are selected from the group consisting of:
searching a database, updating records in the database, performing computations, analyzing data, backing up data, executing one or more programs, and performing tasks through facilitating cooperation between one or more nodes.

3. The method of claim 1, further comprising:
determining, by one or more processors, that the one or more node sub-components have reached a defined point, wherein the defined point is an indication that a sub-component of a node has reached a thermal design point of the sub-component.

4. The method of claim 1, further comprising:
determining, by one or more computer processors, a second set of one or more nodes within the data center that have a corresponding level of power utilization that is below the threshold level of power consumption; and
allocating, by one or more processors, the received task to the determined second set of one or more nodes that have a corresponding level of power utilization that is below the threshold level of power consumption.

5. The method of claim 4, further comprising:
responsive to determining that the allocated task is not complete, determining, by one or more computer processors, another node within the data center that has a corresponding level of power utilization that is below the threshold level of power consumption, wherein the another node is consuming a least amount of power relative to the plurality of nodes in the data center.

6. The method of claim 1, wherein identifying the application characteristic information associated with one or more nodes further comprises:
responsive to determining that application characteristic information is not available, assigning, by one or more processors, the received task to the indicated one or more desired nodes.

7. The method of claim 1:
wherein application characteristic information is selected from the group consisting of: power consumption, sub-component utilization rates, hardware counters, graphics processing unit usage, and memory usage.

8. The method of claim 1, wherein the node characteristic information includes power leakage information and central processing unit (CPU) efficiency information.

9. The method of claim 1, wherein determining sub-component characteristic information associated with the one or more desired nodes further comprises:
determining, by one or more processors, power, temperature, and voltage variations of the respective sub-components of the one or more desired nodes; and
determining, by one or more processors, respective power efficiency ratings for the respective sub-components of the one or more desired nodes based on the determined power, temperature, and voltage variations.

10. The method of claim 1, wherein determining that one or more of the desired nodes have reached a threshold level of power consumption further comprises:
determining, by one or more processors, that a power utilization of a first sub-component of a first node of the one or more desired nodes exceeds a pre-set maximum amount of power utilized, wherein the pre-set maximum amount of power utilized corresponds to a power efficiency rating of the first sub-component.

11. A computer program product for scheduling an application, the computer program product comprising:
one or more computer readable tangible storage media and program instructions stored on at least one of the one or more computer readable storage media, the program instructions readable/executable by one or more computer processors and further comprising:
program instructions to receive a task, wherein the task includes instructions indicating one or more desired nodes, within a data center composed of a plurality of nodes, to perform the task;
program instructions to identify application characteristic information associated with the task, wherein the application characteristic information includes resource utilization information for one or more applications on the one or more desired nodes within the data center associated with executing the task;
program instructions to determine sub-component characteristic information associated with the one or more desired nodes, wherein the sub-component characteristic information includes power efficiency information calculated for each of the respective sub-components of the one or more desired nodes;
in response to determining that the power efficiency information of the one or more desired nodes and respective sub-components meets the application characteristic information associated with executing the task, program instructions to assign the received task to the one or more desired nodes; and
program instructions to determine that one or more of the desired nodes have reached a threshold level of power consumption, wherein a threshold level is a pre-set maximum amount of power utilized by a node within the data center composed of the plurality of nodes.

12. The computer program of claim 11, further comprising program instructions, stored on the one or more computer readable storage media, which when executed by a processor, cause the processor to:
determine that the one or more node sub-components have reached a defined point, wherein the defined point is an indication that a sub-component of a node has reached a thermal design point of the sub-component.

13. The computer program product of claim 11, further comprising program instructions, stored on the one or more computer readable storage media, which when executed by a processor, cause the processor to:
determine a second set of one or more nodes within the data center that have a corresponding level of power utilization that is below the threshold level of power consumption; and
allocate the received task to the determined second set of one or more nodes that have a corresponding level of power utilization that is below the threshold level of power consumption.

14. The computer program product of claim 13, further comprising program instructions, stored on the one or more computer readable storage media, which when executed by a processor, cause the processor to:
responsive to determining that the allocated task is not complete, determining, another node within the data center that has a corresponding level of power utilization that is below the threshold level of power consumption, wherein the another node is consuming a least amount of power relative to the plurality of nodes in the data center.

15. A computer system comprising:
one or more computer processors;
one or more computer readable storage media; and program instructions stored on the computer readable storage media for execution by at least one of the one or more computer processors, the program instructions comprising:

program instructions to receive a task, wherein the task includes instructions indicating one or more desired nodes, within a data center composed of a plurality of nodes, to perform the task;

program instructions to identify application characteristic information associated with the task, wherein the application characteristic information includes resource utilization information for one or more applications on the one or more desired nodes within the data center associated with executing the task;

program instructions to determine sub-component characteristic information associated with the one or more desired nodes, wherein the sub-component characteristic information includes power efficiency information calculated for each of the respective sub-components of the one or more desired nodes;

in response to determining that the power efficiency information of the one or more desired nodes and respective sub-components meets the application characteristic information associated with executing the task, program instructions to assign the received task to the one or more desired nodes; and program instructions to determine that one or more of the desired nodes have reached a threshold level of power consumption, wherein a threshold level is a pre-set maximum amount of power utilized by a node within the data center composed of the plurality of nodes.

16. The computer system of claim 15, wherein the received tasks are selected from the group consisting of: searching a database, updating records in the database, performing computations, analyzing data, backing up data, executing one or more programs, and performing tasks through facilitating cooperation between one or more nodes.

17. The computer system of claim 15, further comprising program instructions, stored on the one or more computer readable storage media, which when executed by a processor, cause the processor to:

determine that the one or more node sub-components have reached a defined point, wherein the defined point is an indication that a sub-component of a node has reached a thermal design point of the sub-component.

18. The computer system of claim 15, further comprising program instructions, stored on the one or more computer readable storage media, which when executed by a processor, cause the processor to:

determine a second set of one or more nodes within the data center that have a corresponding level of power utilization that is below the threshold level of power consumption; and allocate the received task to the determined second set of one or more nodes that have a corresponding level of power utilization that is below the threshold level of power consumption.

19. The computer system of claim 18, further comprising program instructions, stored on the one or more computer readable storage media, which when executed by a processor, cause the processor to:

responsive to determining that the allocated task is not complete, determining, by one or more computer processors, another node within the data center that has a corresponding level of power utilization that is below the threshold level of power consumption, wherein the another node is consuming a least amount of power relative to the plurality of nodes in the data center.

20. The computer system of claim 15, wherein program instructions to identify the application characteristic information associated with one or more nodes further comprises program instructions, stored on the one or more computer readable storage media, which when executed by a processor, cause the processor to:

responsive to determining that application characteristic information is not available, assigning the received task to the indicated one or more desired nodes.

* * * * *